(12) United States Patent
Prasad

(10) Patent No.: US 9,752,053 B2
(45) Date of Patent: Sep. 5, 2017

(54) BARRIER LAYER STACKS AND METHODS AND COMPOSITIONS THEREOF

(71) Applicant: VITRIFLEX, INC., San Jose, CA (US)

(72) Inventor: Ravi Prasad, Corvallis, OR (US)

(73) Assignee: Vitriflex, Inc., San Jose, CA (US)

(*) Notice: Subject to any disclaimer, the term of this patent is extended or adjusted under 35 U.S.C. 154(b) by 218 days.

(21) Appl. No.: 14/424,447

(22) PCT Filed: Aug. 30, 2013

(86) PCT No.: PCT/US2013/057648
§ 371 (c)(1),
(2) Date: Feb. 27, 2015

(87) PCT Pub. No.: WO2014/036478
PCT Pub. Date: Mar. 6, 2014

(65) Prior Publication Data
US 2015/0203714 A1    Jul. 23, 2015

Related U.S. Application Data

(60) Provisional application No. 61/696,113, filed on Aug. 31, 2012.

(51) Int. Cl.
*C09D 175/04* (2006.01)
*F16J 15/10* (2006.01)
(Continued)

(52) U.S. Cl.
CPC .......... *C09D 175/04* (2013.01); *B05D 3/0254* (2013.01); *B05D 5/00* (2013.01);
(Continued)

(58) Field of Classification Search
CPC .. C09D 175/04; C09D 133/08; C09D 163/00; Y10T 428/1379; Y10T 428/24612;
(Continued)

(56) References Cited

U.S. PATENT DOCUMENTS

2002/0125822 A1    9/2002  Graff et al.
2003/0062527 A1*   4/2003  Kumar ............... H01L 51/5237
                                                        257/79
(Continued)

FOREIGN PATENT DOCUMENTS

EP    1930250 A1    6/2008
EP    2221174       8/2010
(Continued)

OTHER PUBLICATIONS

Prasad, Ravi, PCT Application No. PCT/US2013/057648, filed Aug. 30, 2013, Int'l Preliminary Examiner Report dated Mar. 3, 2015.
(Continued)

*Primary Examiner* — Michael C Miggins
(74) *Attorney, Agent, or Firm* — EcoTech Law Group P.C.

(57) ABSTRACT

A barrier layer stack is described. The barrier layer stack includes: (i) a barrier material including defects; (ii) a seal covering the defects of the barrier material; and (iii) wherein, in an operational state of the barrier layer stack, presence of the seal reduces or prevents diffusion of vapor and/or gas molecules through the defects of the barrier material.

17 Claims, 4 Drawing Sheets

(51) Int. Cl.
  B32B 15/082 (2006.01)
  B32B 15/092 (2006.01)
  B32B 15/095 (2006.01)
  B32B 15/20 (2006.01)
  B05D 3/02 (2006.01)
  B05D 5/00 (2006.01)
  C09D 133/08 (2006.01)
  C09D 163/00 (2006.01)

(52) U.S. Cl.
  CPC .......... *B32B 15/082* (2013.01); *B32B 15/092* (2013.01); *B32B 15/095* (2013.01); *B32B 15/20* (2013.01); *C09D 133/08* (2013.01); *C09D 163/00* (2013.01); *F16J 15/102* (2013.01); *F16J 15/108* (2013.01); *B32B 2307/412* (2013.01); *B32B 2307/702* (2013.01); *B32B 2307/7242* (2013.01); *B32B 2439/70* (2013.01); *B32B 2439/80* (2013.01); *B32B 2457/00* (2013.01); *Y10T 428/1379* (2015.01); *Y10T 428/24612* (2015.01); *Y10T 428/265* (2015.01); *Y10T 428/31511* (2015.04); *Y10T 428/31529* (2015.04); *Y10T 428/31551* (2015.04); *Y10T 428/31605* (2015.04); *Y10T 428/31699* (2015.04); *Y10T 428/31938* (2015.04)

(58) Field of Classification Search
  CPC ......... Y10T 428/265; Y10T 428/31511; Y10T 428/31529; Y10T 428/31551; Y10T 428/31605; Y10T 428/31928; F16J 15/102; F16J 15/108; B32B 15/082; B32B 15/092; B32B 15/095; B32B 15/20; B32B 2307/412; B32B 2307/702; B32B 2307/7242; B32B 2439/70; B32B 2439/80; B32B 2457/00; B05D 3/0254; B05D 5/00
  See application file for complete search history.

(56) References Cited

U.S. PATENT DOCUMENTS

| 2003/0219556 A1 | 11/2003 | Shi |
| 2007/0132375 A1 | 6/2007 | Bachmann |
| 2010/0089636 A1 | 4/2010 | Ramadas |
| 2011/0291544 A1 | 12/2011 | Wei et al. |

FOREIGN PATENT DOCUMENTS

| EP | 1930250 A3 | 1/2012 |
| JP | 2005-028835 | 2/2005 |
| WO | WO 03/094256 | 11/2003 |
| WO | WO 2012-103390 | 8/2012 |

OTHER PUBLICATIONS

Prasad, Ravi, PCT Application No. PCT/US2013/057648, filed Aug. 30, 2013, Int'l Search Report dated Jan. 16, 2014.
Prasad, Ravi, PCT Application No. PCT/US2013/057648, Filed Aug. 30, 2013, Int'l Written Opinion and Search Report dated Jan. 16, 2014.
Prasad, Ravi, European Application No. 13832026.2, Int'l Filing Date Aug. 30, 2013, Extended Search Report dated Apr. 12, 206.
Notice of Acceptance Received for Patent Application No. 2013308480, dated May 23, 2017, 3 pages. (English copy Provided).
Office Action Received for Patent Application No. 2015111615/05(018080), dated May 29, 2017, 11 pages (English Translation Provided).

* cited by examiner

BARRIER LAYER STACKS AND METHODS AND COMPOSITIONS THEREOF

RELATED APPLICATION

The application claims priority from U.S. Provisional Application No. 61/696,113, which was filed on Aug. 31, 2012, which is incorporated herein by reference for all purposes.

FIELD OF THE INVENTION

The present invention relates generally to novel barrier layer stacks, and methods and compositions thereof. More particularly, the present invention relates to barrier layer stacks including a seal, and methods of fabricating and compositions thereof.

BACKGROUND OF THE INVENTION

Many products, such as electronic devices, medical devices and pharmaceuticals, are sensitive to water vapor and ambient gases, and exposure to them causes product deterioration and/or product performance degradation. Consequently, blocking coatings or materials are commonly used as a protective measure to safeguard against such undesired exposure.

Plastic coating or films are frequently used as blocking materials. Unfortunately, they suffer from poor gas and liquid permeation resistance, which have values that are typically several orders of magnitude below the requisite value of permeation resistance for acceptable product performance. By way of example, certain LED display and solar cell encapsulation applications require water vapor transmission on the order of $<10^{-4}$ grams/square meter/day, and in contrast, the water vapor transmission rate for Polyethylene Terephthalate (PET), a commonly used plastic film, is in the order of between about 1 and about 10 grams/square meter/day. Those skilled in the art will recognize that water vapor transmission can be thought of as being inversely proportional to water permeation resistance.

Other approaches protect against exposure to undesired elements by applying a blocking coating to plastic films like PET, to reduce water vapor permeability. These coatings are typically single layers of inorganic materials like Al, $SiO_x$, $AlO_x$ and $Si_3N_4$, deposited onto the plastic substrates using well-known vacuum deposition processes. A single layer coating of these inorganic materials typically will reduce the water vapor permeability of PET from 1.0 to 0.1 grams/square meter/day. Thus, single blocking coating on a plastic substrate also fails to meet a requisite value of permeation resistance.

Regardless of whether a single plastic film or a plastic substrate with a blocking coating or material is used as a protective measure, conventional diffusion retarding schemes described above fail to protect an underlying device or product to the requisite extent for a particular application (e.g., solar cell application and LED display application). Specifically, the defects present in the inorganic layer are not effectively filled-in and provide a diffusion pathway for moisture and undesired ambient gases to travel from the surface of the blocking layer to the polymer substrate. Consequently, conventional polymeric films are not able to adequately protect the underlying product that it encapsulates from exposure to moisture and undesired ambient gases. As a result, the underlying product degrades over time, eventually failing and suffering from a relatively shorter life span.

What is, therefore, needed are novel barrier layer designs that effectively protect underlying moisture and gas sensitive products from moisture and undesired ambient gases, and that do not suffer from the drawbacks encountered by conventional designs of films alone or with a blocking coating.

SUMMARY OF THE INVENTION

In view of the foregoing, in one aspect, the present invention provides a barrier layer stack. The barrier layer stack includes: (i) a barrier material including defects; (ii) a seal covering the defects of the barrier material; and (iii) wherein, in an operational state of the barrier layer stack, presence of the seal reduces or prevents diffusion of vapor and/or gas molecules through the defects of the barrier material. In preferred embodiments of the present teachings, the defects include recesses inside barrier material and a substantial amount of the seal does not protrude inside the recesses.

By way of example, the seal has a thickness that ranges from a value that is between about 0.1 μm and about 10 μm and the barrier material has a thickness that ranges from between about 10 nm and about 1 μm. The seal may include a polymer and/or a substantially inorganic material, and preferably includes at least one member chosen from a group comprising acrylates, epoxies and polyurethanes. The barrier material may be an inorganic layer that includes at least one member chosen from a group comprising a metal, a metal oxide, a metal nitride, a metal oxy-nitride, a metal carbo-nitride, and a metal oxy-carbide. In accordance with one aspect of the present arrangements, the inorganic barrier layer includes at least one member chosen from a group comprising aluminum, silver, silicon, zinc, tin, titanium, tantalum, niobium, ruthenium, gallium, platinum, vanadium and indium. The barrier material may be a transparent material.

In one embodiment of the present teachings, the barrier material includes two barrier layers, and a reactive layer is sandwiched between the two barrier layers. In this embodiment, each of the one or more barrier layers may be made from one or more amorphous materials.

In another aspect the present teachings provide a device assembly. The device assembly includes: (i) an underlying device; and (ii) an encapsulant at least partially encapsulating the underlying device, and the encapsulant including: (a) a barrier material including defects; (b) a seal covering the defects of the barrier material; and (c) wherein, in an operational state of the barrier layer stack, presence of the seal reduces or prevents diffusion of vapor and/or gas molecules through the defects of the barrier material. In this aspect, the device assembly may include any one member chosen from a group comprising a solar module, a light generating module, a light-emitting diode display, an electrolytic cell and a reflective display module.

In yet another aspect, the present teachings provide a preserving packaging. The preserving packaging includes: (i) an object that is sensitive to vapor and/or gas molecules; and (ii) an encapsulant at least partially encapsulating the object, and the encapsulant including: (a) barrier material including defects; (b) a seal covering the defects of the barrier material; and (c) wherein, in an operational state of the barrier layer stack, presence of the seal reduces or prevents diffusion of vapor and/or gas molecules through the defects of the barrier material. The object preferably includes one member chosen from a group comprising food product, medical supply and biologically active material.

In yet another aspect, the present teachings provide a process of fabricating a barrier layer stack. The process includes: (i) obtaining a barrier material; (ii) applying an overcoat adjacent to the barrier material; and (iii) curing the overcoat to form the barrier layer stack. Applying the overcoat preferably includes applying at least one member chosen from a group comprising acrylates, epoxies and polyurethanes. Curing of the overcoat may include processing the overcoat at a temperature value that ranges from about 10° C. and about 100° C. and/or processing using UV radiation.

In preferred embodiments of the present teachings, obtaining the barrier material includes: (i) loading a flexible substrate on a coating machine; (ii) displacing the flexible substrate or a portion of the coating machine such that the flexible substrate acquires a first position inside the coating machine; and (iii) fabricating one or more barrier layers on the flexible substrate when the flexible substrate is at the first position, and the barrier layer includes defects which allow transport of vapor and/or gas molecules therethrough.

In yet another aspect, the present teachings provide a composition of a barrier layer stack. The composition includes: (i) a barrier material having defects which allow transport of gases and/or vapor, and the barrier material including at least one member chosen from a group comprising metal, metal oxide, metal nitride, metal oxy-nitride, metal carbo-nitride, and metal oxy-carbide -nitride; and (ii) a seal including a polymeric material that is at least one member chosen from a group comprising acrylates, epoxies and polyurethanes.

The barrier material may have a concentration that is between about 1% (by weight) and about 99% (by weight) and the seal may have a concentration that is between about 1% (by weight) and about 99% (by weight).

The construction and method of operation of the invention, however, together with additional objects and advantages thereof, will be best understood from the following descriptions of specific embodiments when read in connection with the accompanying figures.

DETAILED DESCRIPTION OF THE PREFERRED EMBODIMENTS

In the following description, numerous specific details are set forth in order to provide a thorough understanding of the present invention. It will be apparent, however, to one skilled in the art that the present invention may be practiced without limitation to some or all of these specific details. In other instances, well-known process steps have not been described in detail in order to not unnecessarily obscure the invention.

Figure 1:
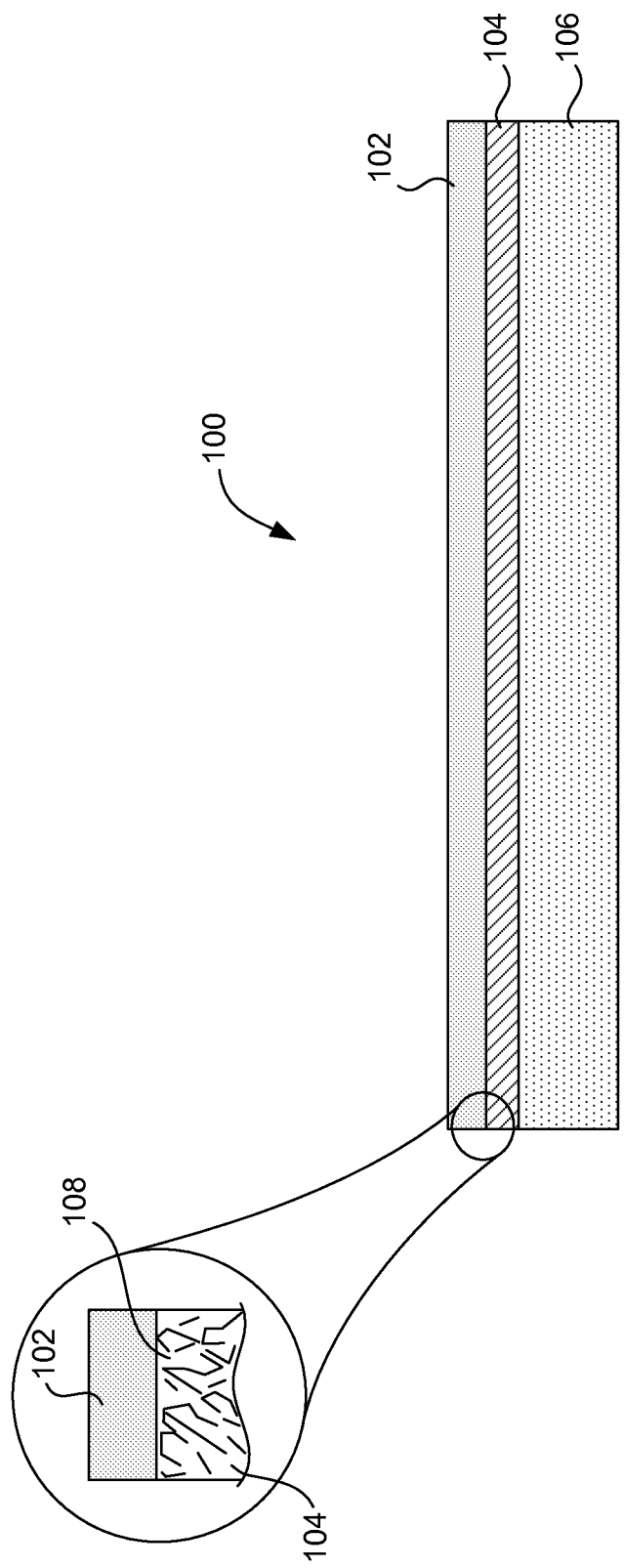
FIG. 1 shows a side-sectional view of a barrier layer stack, according to one embodiment of the present arrangements, for protecting against moisture and other undesirable gases.

FIG. 1 shows a barrier layer stack 100, according to one embodiment of the present arrangements. Barrier layer stack 100 includes a barrier material 104 sandwiched between a seal 102 and a substrate 106 (e.g., plastic substrate). Barrier material 104 is designed to offer barrier properties to an underlying device, such as a solar cell, a light source, a light-emitting diode, an electrolyte, an anode, a cathode and a reflective display. The underlying device is preferably disposed adjacent to substrate 106 or seal 102.

Barrier material 104 primarily imparts barrier properties to barrier layer stack 100. Such barrier properties include reducing or preventing transport of foreign objects and/or gases into the underlying device. The present teachings recognize, however, that barrier material 104 typically includes defects 108, which has recesses that provides a pathway for transportation of gases and/or vapor into the underlying device. As a result, one aspect of the present teachings offers a top seal (e.g., seal 102) that covers defects 108 of barrier material 104. In this aspect, top seal 102 is not conformal with respect to barrier material 104. In other words, portions of top seal 102 do not protrude into and plug up defects 108 of barrier material 104. Moreover, arrangements, which do not require top seal 102 to protrude into, react or covalently bond with barrier material 104, represent preferred embodiments of the present teachings. The present teachings offer top seal 102 as a sealing layer that covers (or, in the alternate, seals off) defects 108, preventing gas and/or vapor molecules from being transported into defects 108.

Figure 2:
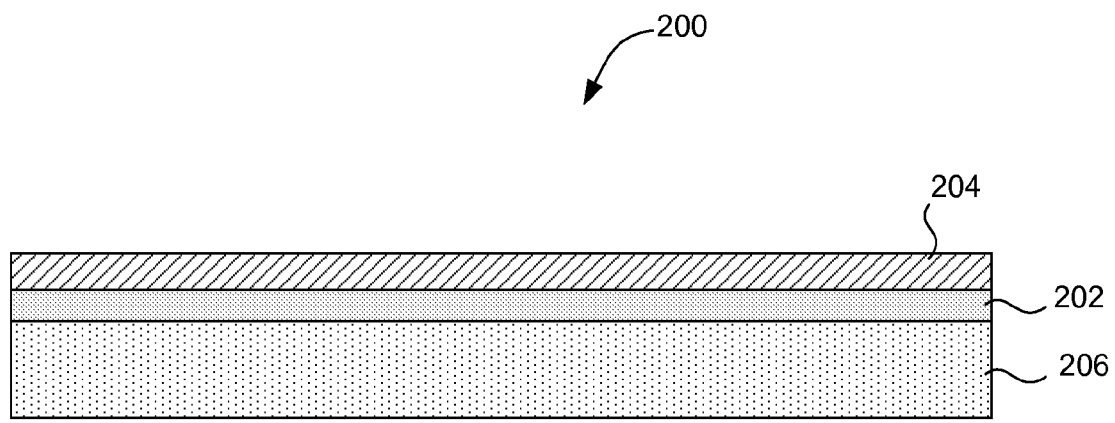
FIG. 2 shows a side-sectional view of another barrier layer stack, according to another embodiment of the present arrangements, for protecting against moisture and other undesirable gases.

FIG. 2 shows a barrier layer stack 200, according to an alternate embodiment of the present arrangement. Barrier layer stack 200 includes a seal 202, a barrier material 204 and a substrate 206, which are substantially similar to their counterparts (i.e., barrier material 104, seal 102 and substrate 106) in FIG. 1. In FIG. 2, however, seal 202 is sandwiched between barrier material 204 and substrate 206. Regardless of which side of a barrier material a seal is positioned, the seal seals off the defects such that gas and/or vapor molecules do not enter the recesses of defects, making the barrier layer impervious to them. As a result, both barrier layer stacks 100 and 200 serve as effective encapsulants in a variety of applications, e.g., solar module, a light generating module, a light-emitting diode display, an electrolytic cell and a reflective display module.

A substrate (e.g., substrates 106 and 206) may be anything that is capable of receiving a barrier material or a seal. Preferably, however, it is a flexible material made from plastic. Barrier material (e.g., barrier material 104 and 204) may include any material that serves as a barrier to moisture and undesired gases, such as oxygen, nitrogen, hydrogen, carbon dioxide, argon and hydrogen sulfide. In preferred embodiment of the present arrangements, barrier material includes at least one material chosen from a group comprising metal, metal oxide, metal nitride, metal oxy-nitride, metal carbo-nitride and metal oxy-carbide. Furthermore, the barrier material more preferably includes carbon or oxygen, in their elemental form or as part of chemical compounds. Representative barrier material of the present teachings include silicon oxide, aluminum oxide, aluminum nitride, aluminum oxy-nitride, tantalum oxide, niobium oxide, silicon nitride, silicon oxy-nitride, silicon oxy-carbide and silicon carbo-nitride.

In one embodiment of the present teachings, barrier material is made from one or more layers of an inorganic material. In preferred embodiments of the present teachings, barrier material includes an amorphous material. When more than one inorganic layer is used to produce a barrier material, then the different layers are preferably stacked adjacent each other. It is not necessary that the type of inorganic material used in each layer (used to form the barrier material) is the same, and may be different in certain embodiments of the present teachings. Although barrier material may be made from any inorganic material that serves as a barrier to the above-mentioned gases, in preferred embodiments of the present arrangements, barrier material includes a metal composition, present in its elemental form or as a compound (as described above). The metal composition may include at least one member chosen from a group comprising aluminum, silver, silicon, zinc, tin, titanium, tantalum, niobium, ruthenium, gallium, platinum, vanadium, and indium. By way of example, a metal oxide includes $Al_xO_y$ and/or $SiO_x$. In a barrier material according to the present teachings, it is believed that the presence of effective amount of metals or metal oxides reduces transport of undesired gas and/or vapor molecules through the barrier material. In preferred embodiments of the present teachings, metals or metal oxides present in barrier materials have a concentration that is between about 1% (by weight) and about 100% (by weight), and preferably between about 1% (by weight) and about 50% (by weight).

It is generally believed that increasing a thickness of barrier material increases its barrier properties. The present teachings, however, recognize that if the barrier material is fabricated too thick, i.e., thickness increases beyond a certain value, the resulting barrier material may be brittle and/or may easily crack. Resulting cracks provide a pathway for transporting gas and/or vapor molecules through the barrier material. To this end, the present teachings recognize that the thickness of the barrier material preferably should strike a balance between thick enough to provide enhanced barrier properties, but not being too thick as to become susceptible to cracking. Barrier material (e.g., barrier material 104 and 204), therefore, may be of any thickness that strikes this balance. In preferred embodiments of the present teachings, barrier material has a thickness that is between about 10 nm and about 1 micron, and that is preferably between about 20 nm and about 300 nm.

Although barrier material in the present arrangements is designed to reduce transport of gas and/or vapor molecules therethrough, it is not completely impervious to moisture and certain gases. Consequently, in one embodiment of the present arrangements, barrier material (e.g., barrier material 104 and 204) includes a reactive component or layer (hereinafter "reactive component"), which is designed to react with moisture and molecules of undesired gases, e.g., oxygen, nitrogen, hydrogen, carbon dioxide, argon and hydrogen sulfide, that diffuse into the barrier material. According to conventional wisdom, reactive nature of the reactive component is undesirable in solar cell and other applications, because it absorbs moisture and undesirable gases, causing product performance degradation and eventually leading to product failure. The present teachings, however, innovatively uses the reactive nature of the reactive component in a manner that is useful for barrier stack applications. Specifically, moisture and and/or undesired gases that diffuse into the barrier layer 202 react with the reactive layer component, allowing barrier layer stacks 100 or 200 to be substantially impervious to the diffused gas and/or vapor molecules.

The reactive component may be made from any inorganic material and is preferably chemically homogenous. In preferred embodiments of the present teachings, however, reactive component includes at least one reactive material chosen from a group comprising alkali metal oxide, zinc oxide, titanium oxide, metal-doped zinc oxide and silicon oxide. In certain embodiments of the present teachings, reactive layer 204 is doped with one or more non-oxide chemical components. Representative non-oxide dopant materials include alkali metals, such as calcium, sodium and lithium.

Like the barrier material (e.g., barrier materials 104 and 204), reactive component 204 may include one or more reactive layers that are disposed adjacent to each other. In this arrangement, each of one or more reactive layers may be made from the same material or from different materials. Regardless of the number of layers used, the reactive component includes an effective amount of a reactive material to react with moisture and undesired or ambient gases that have diffused into the barrier material. According to the preferred embodiments of the present teachings, reactive material in the reactive component has a concentration that is between about 1% (by weight) and about 100% (by weight). In more preferred embodiments of the present teachings, however, reactive material in the reactive component has a concentration that is between about 90% (by weight) and about 100% (by weight).

If employed in layer form, the reactive component may have a total thickness that is between about 10 nm and about 1 micron and that is preferably between about 20 nm and about 500 nm. In certain applications where barrier layer stack arrangement of the present teachings is fabricated on a plastic substrate and used as an encapsulant, there is a risk that during shipping, handling and storage of the encapsulated product, moisture and/or undesired ambient gases diffuse through the plastic substrate and react with reactive layer 204. As a result, the required reactive property of the reactive component may be depleted, rendering the barrier layer stack ineffective. To this end, certain preferred embodiments of the present teachings provide an additional barrier layer, which is disposed between the substrate (e.g., substrates 106 and 206) and the reactive component. In some of these embodiments, the reactive component is sandwiched between two barrier layers to for a barrier material (e.g., barrier materials 104 and 204).

If the reactive component is compositionally similar to barrier material, then it is preferable to have the reactive component sufficiently different from the barrier material in structure, degree of doping, degree of crystallinity (including a scenario where one layer is amorphous, while the other is not), or reactivity to bind with moisture and/or undesired ambient gases. A reactive component having a columnar structure represents a preferred embodiment of the present teachings as it provides more active surface area to react with the diffused chemical species.

Although a barrier layer and a reactive component in a barrier material may be arranged to contact each other, it is not necessary that they do so. In certain embodiments of the present invention where a layered arrangement is used to form a barrier material, an intermediate layer, serving one or more of variety of functions, may be interposed between the barrier layer and the reactive component (which is present as a layer). By way of example, an intermediate layer may be used to planarize either or both of the surfaces of the barrier material and the reactive component, between which it is interposed. As a result, in those instances where the specification uses the term "adjacent" in connection with two materials, layers and/or components, it does not intend to convey that such materials, layer and/or components are limited to embodiments where they contact each other. Rather, using the term "adjacent" in connection with materials, layers and/or components, also conveys that the materials, layer and/or compositions may have one or more intermediate layers interposed between them.

Furthermore, according to certain preferred embodiments of the present teachings, the barrier layer and the reactive component may be made from one or more different types of inorganic materials. However, in other embodiments of the present invention, the barrier layer and the reactive component are not so limited. In certain embodiments of the present arrangements, each of the barrier layer and the reactive component are made from one or more different types of organic materials.

In preferred embodiments of the present teachings, barrier layer stacks (e.g., barrier layer stacks 100 and 200) are used as an encapsulant. By way of example, in a solar cell application, the above-described barrier layer stacks are used to encapsulate a solar cell. As another example, in a lighting application, where a light-generating module is used, the above-described barrier layer stacks are used to encapsulate a light source. As yet another example, in an electrolytic cell application, above-described barrier layer stacks are used to encapsulate a cathode, an anode and an electrolyte. As yet another example, in display applications, the above-described barrier layer stacks are used to encapsulate displays, such as an LED display or a reflective display. The present teachings recognize that encapsulation of solar cells, light generating modules, electrolytic cells, LED displays and reflective displays may be carried out using techniques well known to those skilled in the art.

In certain other embodiments of the present teachings, barrier layer stacks shown in FIG. 1 or 2 are adapted to serve as a preserving packaging to store moisture-sensitive objects. In this embodiment, the moisture-sensitive objects is at least one member chosen from a group comprising food product, medical supply and biologically active material.

According to conventional wisdom, when one layer is fabricated adjacent to another layer to form a multilayer stack, a defect present in one layer undesirably propagates to the adjacent layer. The defect propagation problem exacerbates as the number of layers in the multilayer stack increases. In sharp contrast, the present teachings have surprisingly and unexpectedly found that a seal (e.g., seals 102 and 202) cover defects found in and smoothens the adjacent layer. As a result, barrier layer stacks are particularly advantageous for moisture and/or vapor barrier applications because they prevent or significantly reduce the propagation of defects or undesired structure from one layer to another.

Although barrier layer stacks may be made using any technique well known to those skilled in the art, using a roll-to-roll technique, which provides a relatively high throughput, represents a preferred embodiment of the present teachings. FIG. 5 shows a top view of a coating machine 300, according to one embodiment of the present teachings. The coating machine is also called a "roll coater" as it coats a roll of flexible film. Coating machine 300 includes an unwind roller 302, an idle roller 304, a takeup roller 306, a temperature controlled deposition drum 308, one or more deposition zones 310, and a deposition chamber 312. Each of one or more deposition zones 310 includes a target material that is ultimately deposited on flexible substrate, a power supply and shutters, as explained below.

A coating process, according to one embodiment of the present invention, begins when a flexible substrate 314 is loaded onto unwind roller 302. Flexible substrate 314 is preferably wrapped around a spool that is loaded onto unwind roller 302. Typically a portion of the wrapped flexible substrate is pulled from the spool and guided around idle rollers 304 and deposition drum 308, which is capable of rotating, so that it connects to takeup roller 306. In the operating state of coating machine 300, unwind roller 302, takeup roller 306 and deposition drum 308 rotate, causing flexible substrate 314 to displace along various locations around cooled deposition drum 308.

Once flexible substrate 314 is loaded inside coating machine 300, the coating process includes striking plasma inside deposition zone 310. Shutters in the coating zones direct charged particles in the plasma field to collide with and eject the target material so that it is deposited on the flexible substrate. During the coating process, a temperature of flexible substrate 314 is controlled using deposition drum 308 preferably to values such that no damage is done to the substrate. In those embodiments of the present invention where flexible substrate 314 includes a polymeric material, deposition drum 308 is cooled such that the temperature of the deposition drum is preferably near or below a glass transition temperature of the polymeric material. Such cooling action prevents melting of the polymer-based substrate during the deposition process, and thereby avoids degradation of the polymer-based substrate that might occur in the absence of deposition drum 308.

Figure 3:
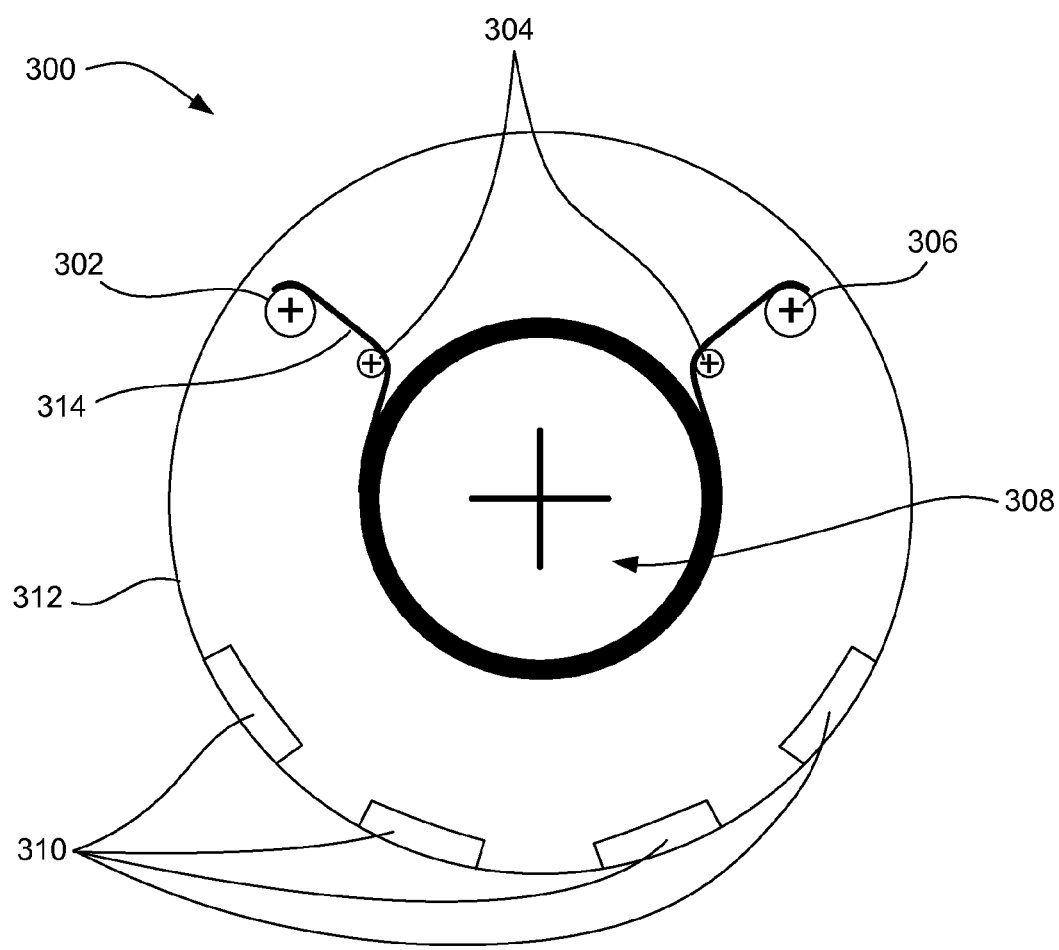
FIG. 3 is a top view of a coating machine, according to one embodiment of the present teachings that facilitates roll-to-roll manufacture of the inventive barrier layer stacks (e.g., barrier layer stacks of FIGS. 1 and 2.

As can be seen from FIG. 3, multiple deposition zones are provided, each of which may be dedicated to effecting deposition of one particular material on the polymeric substrate. By way of example, the target material, in one of the deposition zones, includes at least one member chosen from a group comprising metal, metal oxide, metal nitride, metal oxy-nitride, metal carbo-nitride, and metal oxy-carbide to facilitate deposition of a barrier layer (e.g., to fabricate barrier layer in barrier materials 104 or 204).

As another example, the target material in another of the deposition zones includes at least one member chosen from a group comprising acrylates, epoxies and polyurethanes to fabricate another barrier layer that may be used inside barrier layer stacks of the present teachings. If a reactive component is not deemed necessary, however, such a target material may not be included in a deposition zone.

As yet another example, the target material in yet another of the deposition zones includes at least one member chosen from a group comprising alkali metal oxide, zinc oxide, titanium oxide, metal-doped zinc oxide and silicon oxide to fabricate a reactive component that may be used inside the barrier material.

By displacing flexible substrate 314 from one location to another, different types and different thicknesses of target material, at different deposition zones, can be deposited on the substrate. Coating machine 300 can be used to implement at least one technique chosen from a group comprising sputtering, reactive ion sputtering, evaporation, reactive evaporation, chemical vapor deposition and plasma enhanced chemical vapor deposition.

It is noteworthy that instead of displacing the substrate from one position to another to facilitate deposition of multiple layers, the inventive features of the present teachings can be realized by holding the substrate stationary and displacing at least a portion of the coating machine or by displacing both the substrate and the coating machine.

Regardless of the specific process implemented for deposition, it will be appreciated that the roll-to-roll technique of the present invention allows for very rapid deposition of different types and thicknesses of layers on a substrate to form the barrier layer stacks according to the present arrangement. The inventive roll-to-roll fabrication process realizes a very high throughput, which translates into increased revenue. Against the current backdrop where the solar cell industry is being challenged to become a commercially viable alternate energy solution, the barrier layer stacks and processes of the present teachings represent a marked improvement over the conventional designs and processes.

Figure 4:
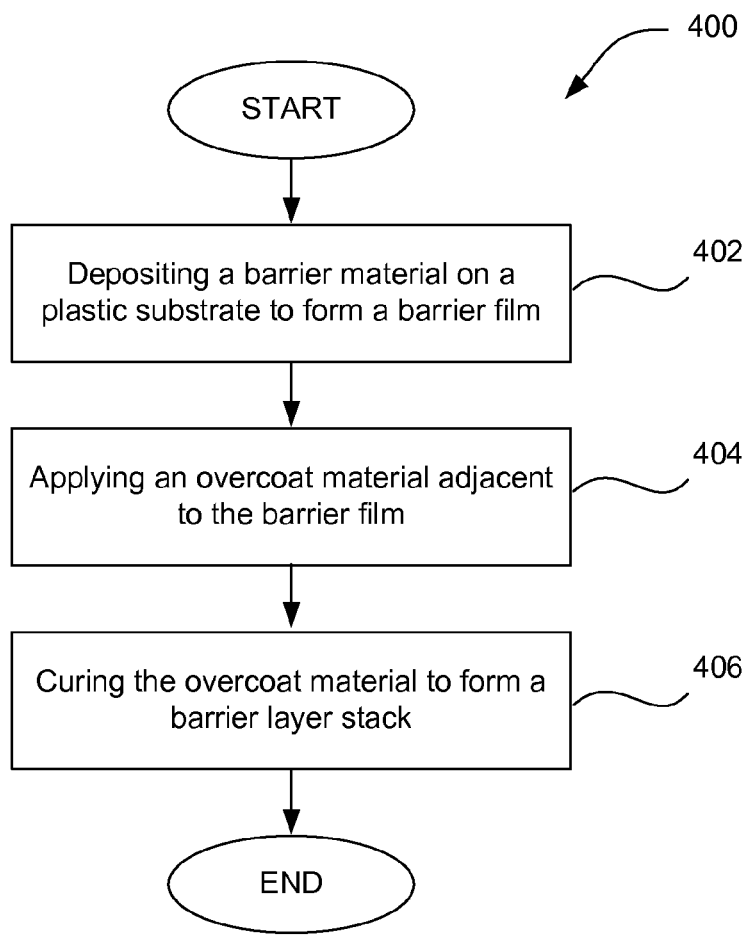
FIG. 4 is a process flow diagram of a fabrication method, according to one embodiment of the present teachings, for the inventive barrier layer stacks (e.g., barrier layer stacks of FIGS. 1 and 2.

FIG. 4 shows a method 400, according to one embodiment of the present teachings, of fabricating a seal (e.g., seals 102 and 202) on a barrier material (e.g., barrier materials 104 and 204). Method 400 includes a step 402 of depositing a barrier material on a substrate to form a barrier film. By way of example, a barrier film is formed using the process described above in connection with coating machine 300 of FIG. 3.

Next, in a step 404, an overcoat material (e.g., a polymeric solution) is applied to a barrier film or a layer adjacent to the barrier film. By way of example, techniques such as roll-to-roll coating method describe in connection with FIG. 3 or atmospheric roll coating processes are used to apply the overcoat material in this step. Preferably, the overcoat material applied is thick enough to cover up the defects (e.g., recesses) present in the barrier material. Seal material includes at least one member chosen from a group comprising acrylates, epoxies and polyurethanes.

In a step 406, the overcoat material is cured to form a barrier layer stack, according to one embodiment of the present teachings. Seal material includes at least one member chosen from a group comprising acrylates, epoxies and polyurethanes. In preferred embodiments of the present teachings, seal materials include a polymer that lends itself to thermal and/or radiation (e.g., UV radiation) curing to form a polymeric film. Temperatures for curing the seal material are values that range from between about 10° C. and about 100° C. In another embodiment of the present teachings, instead of curing in step 406, the overcoat undergoes processing at a certain temperature and/or processing using UV radiation.

The present teachings recognize that although barrier material and seal may be composed of a variety of materials, but those that have effective light transmitting or preferably transparent properties represent preferred embodiments, particularly for use in connection with such devices as solar cells, light sources and light-emitting diodes.

The present teachings provide a composition of a barrier layer stack. In accordance with one embodiment of the present teachings, the barrier layer stack includes a barrier material having defects, which allow transport of gases and/or vapor and seal that covers those defects. By way of example, the barrier material includes at least one member chosen from a group comprising metal, metal oxide, metal nitride, metal oxy-nitride, metal carbo-nitride, and metal oxy-carbide—nitride. The seal may include a polymeric material that is at least one member chosen from a group comprising acrylates, epoxies and polyurethanes.

The barrier material preferably has a concentration that is between about 1% (by weight of the barrier layer stack) and about 99% (by weight of the barrier layer stack). In one embodiment of the present teachings, the barrier material has a concentration that is between about 0% (by weight of oxygen) and about 90% (by weight of oxygen). In another embodiment of the present teachings, the barrier material has a concentration that is between about 100% (by weight of metal) and about 10% (by weight of metal). The seal may have a concentration that is between about 1% (by weight of the barrier layer stack) and about 99% (by weight of the barrier layer stack).

Although illustrative embodiments of this invention have been shown and described, other modifications, changes, and substitutions are intended. By way of example, the present invention discloses barriers of simple gases and water vapor; however, it is also possible to reduce the transport of organic material using the systems, processes, and compositions of the present teachings. Accordingly, it is appropriate that the appended claims be construed broadly and in a manner consistent with the scope of the disclosure, as set forth in the following claims.

What is claimed is:

1. A barrier layer stack, comprising:
a barrier material including defects;
a seal completely covering said defects of said barrier material, wherein said defects include recesses inside barrier material and a substantial amount of said seal does not protrude inside said recesses; and
wherein, in an operational state of said barrier layer stack, presence of said seal reduces or prevents diffusion of vapor and/or gas molecules through said recesses inside said barrier material.

2. The barrier layer stack of claim 1, wherein said seal has a thickness that ranges from a value that is between about 0.1 µm and about 10 µm.

3. The barrier layer stack of claim 1, wherein said seal includes at least one member chosen from a group comprising acrylates, epoxies and polyurethanes.

4. The barrier layer stack of claim 1, wherein said seal includes a polymer and/or a substantially inorganic material.

5. The barrier layer stack of claim 1, wherein the thickness of said barrier material is between about 10 nm and about 1 µm.

6. The barrier layer stack of claim 1, wherein said barrier material layer is substantially transparent.

7. The barrier layer stack of claim 1, wherein said barrier material is an inorganic layer that includes at least one member chosen from a group comprising a metal, a metal oxide, a metal nitride, a metal oxy-nitride, a metal carbo-nitride, and a metal oxy-carbide.

8. The barrier layer stack of claim 7, wherein said inorganic barrier layer includes at least one member chosen from a group comprising aluminum, silver, silicon, zinc, tin, titanium, tantalum, niobium, ruthenium, gallium, platinum, vanadium and indium.

9. The barrier layer stack of claim 1, wherein said barrier material includes two barrier layers, and a reactive layer is sandwiched between said two barrier layers.

10. The barrier layer stack of claim 9, wherein each of said one or more barrier layers is made from one or more amorphous materials.

11. A device assembly comprising:
an underlying device; and
an encapsulant at least partially encapsulating said underlying device, and said encapsulant including:
a barrier material including defects;
a seal completely covering said defects of said barrier material, wherein said defects include recesses inside barrier material and a substantial amount of said seal does not protrude inside said recesses; and
wherein, in an operational state of said barrier layer stack, presence of said seal reduces or prevents diffusion of vapor and/or gas molecules through said recesses inside said barrier material.

12. The device assembly of claim 11, wherein said device assembly includes any one member chosen from a group comprising a solar module, a light generating module, a light-emitting diode display, an electrolytic cell and a reflective display module.

13. A preserving packaging comprising:
an object that is sensitive to vapor and/or gas molecules; and
an encapsulant at least partially encapsulating said object, and said encapsulant including:
a barrier material including defects;
a seal completely covering said defects of said barrier material, wherein said defects include recesses inside barrier material and a substantial amount of said seal does not protrude inside said recesses; and
wherein, in an operational state of said barrier layer stack, presence of said seal reduces or prevents diffusion of vapor and/or gas molecules through said recesses inside said barrier material.

14. The preserving packaging of claim 13, wherein said object includes one member chosen from a group comprising food product, medical supply and biologically active material.

15. A composition of a barrier layer stack, comprising:
a barrier material having defects which allow transport of gases and/or vapor, and said barrier material including at least one member chosen from a group comprising metal, metal oxide, metal nitride, metal oxy-nitride, metal carbo-nitride, and metal oxy-carbide-nitride; and
a non-conformal seal including a polymeric material that is at least one member chosen from a group comprising acrylates, epoxies and polyurethanes.

16. The composition of claim 15, wherein said barrier material has a concentration that is between about 1% (by weight) and about 99% (by weight).

17. The composition of claim 15, wherein said seal has a concentration that is between about 1% (by weight) and about 99% (by weight).

* * * * *